United States Patent [19]

Burrows

[11] Patent Number: 4,880,535

[45] Date of Patent: Nov. 14, 1989

[54] WATER SUPPLY STATION WITH MULTIPLE WATER STORAGE RESERVOIRS

[76] Inventor: Bruce D. Burrows, 25581 Via Paladar, Valencia, Calif. 91355

[21] Appl. No.: 312,760

[22] Filed: Feb. 21, 1989

[51] Int. Cl.⁴ ............................................. B01D 36/00
[52] U.S. Cl. .................................... 210/181; 210/248; 210/255; 210/257.2; 210/262; 210/321.72; 222/189; 137/562
[58] Field of Search ............... 210/175, 176, 181, 248, 210/252, 253, 255, 257.1, 257.2, 340, 260, 262, 321.6, 321.71, 321.72, 195.1, 195.2; 222/189; 251/205, 208, 210; 137/562

[56] References Cited

U.S. PATENT DOCUMENTS

| | | | |
|---|---|---|---|
| 3,945,923 | 3/1976 | Rogers et al. | 210/253 |
| 4,219,424 | 8/1980 | Tamura et al. | 210/255 |
| 4,604,194 | 8/1986 | Entingh | 210/257.2 |
| 4,623,467 | 11/1986 | Hamlin | 210/257.2 |
| 4,692,246 | 9/1987 | Simon | 210/255 |
| 4,744,895 | 5/1988 | Gales et al. | 210/257.2 |
| 4,752,389 | 6/1988 | Burrows | 210/181 |
| 4,769,151 | 9/1988 | Shouldice | 210/181 |

Primary Examiner—Richard V. Fisher
Assistant Examiner—Wanda L. Millard
Attorney, Agent, or Firm—Kelly, Bauersfeld & Lowry

[57] ABSTRACT

A water supply station is provided with series connected reservoirs for receiving and storing potable water or the like under different temperature conditions. The station includes a first reservoir for receiving an incoming water flow, and a second reservoir coupled to the first reservoir via an overflow conduit. When the first reservoir reaches a substantially filled condition, additional water flow spills through the overflow conduit for passage into the second reservoir. The water within the two reservoirs is maintained under different conditions, such as at selected cold and hot temperatures, respectively, ready for immediate dispensing through appropriate dispensing valves. The water supply station is particularly adapted for use as a countertop unit wherein the reservoirs respectively store water for immediate dispensing and use, for example, in cold or hot beverages.

15 Claims, 4 Drawing Sheets

WATER SUPPLY STATION WITH MULTIPLE WATER STORAGE RESERVOIRS

BACKGROUND OF THE INVENTION

This invention relates generally to water supply systems of the type adapted to provide potable water for use in drinking, cooking, etc. More particularly, this invention relates to an improved water supply station for convenient storage and dispensing of potable water maintained at different temperature conditions, such as at selected cold and hot temperatures.

Domestic water supply systems for residential and/or commercial uses commonly include parallel hot and cold water supply conduits for respectively providing water at different temperatures for immediate use upon appropriate opening of individual hot and cold faucet valves. These water supply conduits conventionally receive incoming feed water from a water main, wherein this feed water normally has a relatively cool ambient temperature of about 50°-60° F. The cold water conduit couples this feed water without heating or chilling to the cold water faucet valve for dispensing purposes. An appropriate water heater is installed in-line with the hot water supply conduit to elevate the temperature of the water flowing therethrough, typically to a heated temperature range on the order of 120°-150° F.

Although standard water supply systems, as described above, provide potable water at different temperatures, such systems are not designed to provide water at temperatures desirable for use directly and immediately in heated or chilled beverages. More specifically, the cold water supply normally has a temperature significantly greater than an optimum cold beverage temperature range of about 35°-45° F. Similarly, the hot water supply is normally set at a temperature which is sufficiently low to prevent scald injuries and further to minimize hot water heater energy requirements. However, these considerations mandate a hot water temperature significantly below a desirable temperature range of about 180°-210° F. for use in hot beverages such as coffee and tea. Accordingly, when hot and/or cold beverages are prepared, it has been necessary to dispense water from the water supply system and then to subject the dispensed volume of water to heating or chilling, as appropriate.

In recent years, various secondary heating devices have been proposed for use in providing hot water at an elevated temperature sufficient for use in hot beverages. Such devices have commonly included a heating element, typically of the electrical resistance type, for mounting on or near the hot or cold faucet valve of the water supply system. The heating element is intended to heat water as it is dispensed from the faucet valve. However, such devices interfere with normal dispensing of hot and cold water supplies for nonbeverage use. Moreover, such devices do not have any capability to chill dispensed water to a pleasing low temperature for use in cold beverages.

In addition, in recent years, a variety of water purification systems have been developed for residential and/or commercial use to remove contaminants of the type found in many domestic feed water supplies. Many such purification systems have utilized reverse osmosis technology to produce a supply of purified water at a relatively slow rate for storage within an appropriate reservoir ready for immediate dispensing and use. In many cases, the reverse osmosis system inclusive of the storage reservoir is sized for compact installation beneath a standard kitchen sink or the like, thereby permitting convenient in-home use. U.S. Pat. No. 4,752,389 describes a reverse osmosis purification system of this type wherein a compact and energy efficient thermoelectric heat transfer module is provided to chill the stored purified water to a pleasing cold beverage temperature. Accordingly, this system (U.S. Pat. No. 4,752,389) beneficially provides chilled purified water in addition to the normal hot and cold water supplies. However, additional provision of a purified water supply ready for hot beverage use is not contemplated.

The present invention provides an improved water supply system having compact and energy efficient means for providing chilled and heated water supplies suitable for direct beverage use, in addition to normal hot and cold water supplies for nonbeverage use. The invention is beneficially designed to be integrated with reverse osmosis purification components to provide purified chilled and heated water supplies.

SUMMARY OF THE INVENTION

In accordance with the invention, an improved water supply station includes means for receiving and storing selected quantities of potable water at different temperature conditions, particularly such as at hot and cold temperatures suitable for direct beverage use. The water supply station is adapted to be integrated into a standard domestic water supply system having, for example, hot and cold water supply conduits. Moreover, the improved water supply system is designed for use with purification means such as a reverse osmosis unit to provide purified water volumes maintained at different temperatures. In the preferred form, the station is constructed as a compact countertop unit for placement, for example, adjacent a kitchen sink or the like.

In accordance with the invention, the improved water supply station comprises at least two water storage reservoirs coupled in series flow relation to an incoming feed or tap water supply. The reservoirs are interconnected by a relatively narrow overflow conduit such that the feed water fills the reservoirs in series. One or more of the reservoirs includes temperature control means such that the reservoirs maintain the water therein at a selected temperature level. Moreover, the reservoirs include individual dispensing valves to permit individual dispensing therefrom.

In a preferred system arrangement, first and second reservoirs are connected in series by the overflow conduit. Incoming feed water fills the first reservoir and then spills through the overflow conduit to fill the second reservoir. A reverse osmosis unit substantially purifies the feed water at a location upstream of the reservoirs such that substantially pure water flows to and fills the reservoirs. Temperature control means are provided with both reservoirs such as a thermoelectric heat transfer module having a cold side in association with the first reservoir and a resistance heating element in association with the second reservoir. With this arrangement, the two reservoirs respectively store water which is chilled or heated to appropriate temperatures suitable for direct use in cold or hot beverages. Efficient heat transfer operation of the thermoelectric module is beneficially obtained by mounting a hot side of the module in heat exchange relation with a system water flow, such as a reject water flow from the reverse osmosis unit.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figures 1, 2:
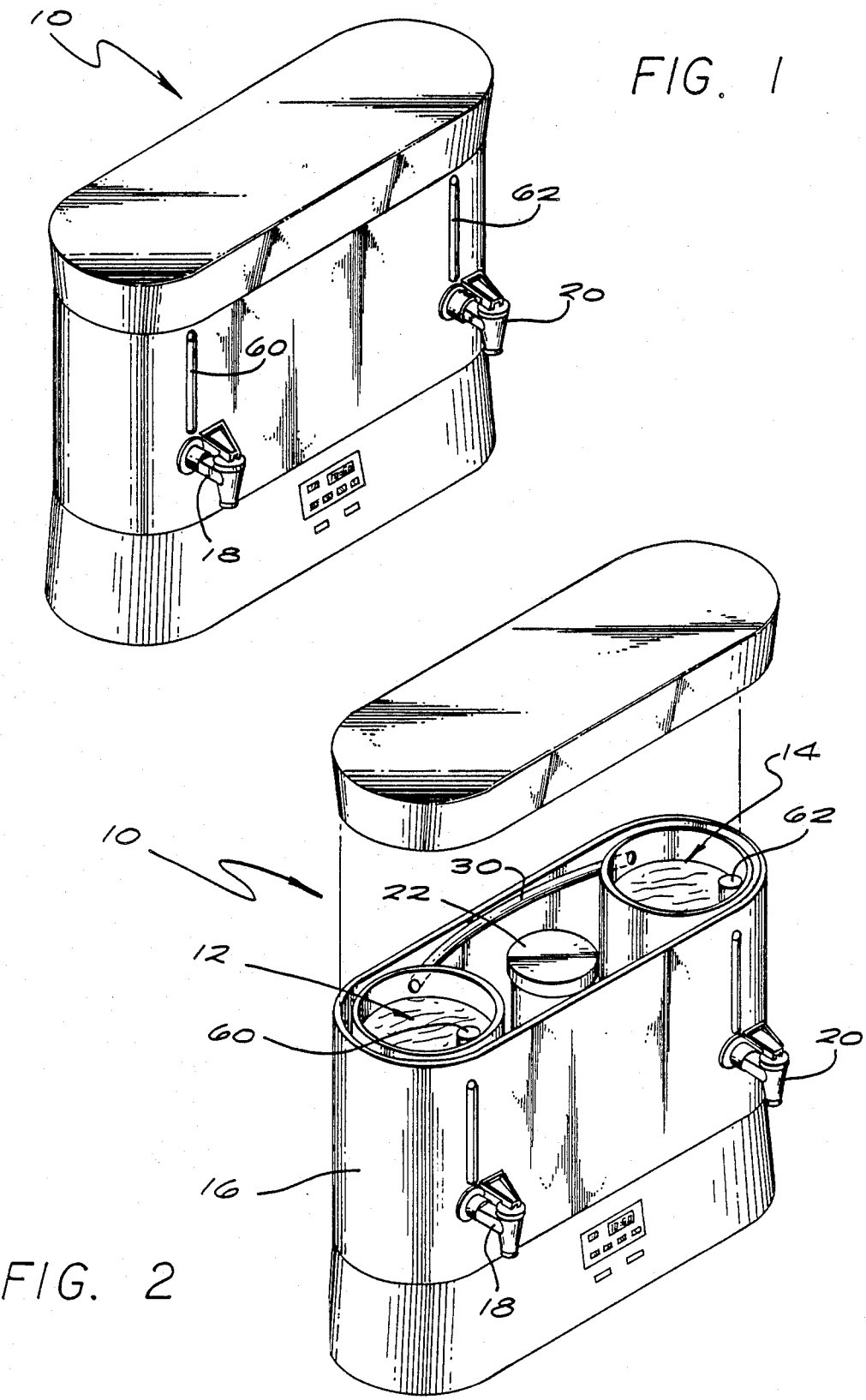
FIG. 1 is a perspective view illustrating a water supply station embodying the novel features of the invention.
FIG. 2 is an exploded perspective view of the water supply stations illustrating a reverse osmosis unit mounted between a pair of water storage reservoirs.

As shown in the exemplary drawings, an improved water supply station referred to generally in FIGS. 1 and 2 by the reference numeral 10 is provided for receiving and storing multiple quantities of water at different selected conditions such as at different temperatures. The station 10 includes multiple water storage reservoirs 12 and 14 which can be conveniently integrated into a compact unit housing 16 for countertop installation or the like, with the reservoirs 12 and 14 including separate dispensing valves 18 and 20 to permit dispensing and use of the water stored therein. In the preferred arrangement depicted in FIGS. 1 and 2, the reservoirs 12 and 14 include temperature control means for maintaining the water stored therein respectively at cold and hot temperatures suitable for direct use in cold and hot beverages.

The water supply station 10 of the present invention is designed to receive an incoming feed or tap water flow from a standard domestic water supply system. In this regard, the invention is adapted for connection to the standard water supply system without interference with conventional use and operation of the standard hot and cold water supply conduits and the associated hot and cold faucet valves (not shown) used for normal water dispensing. The normal temperatures of the standard hot and cold water supplies are not suitable for direct beverage use. The present invention provides means for storing selected quantities of water obtained, for example, by tapping into the standard cold water supply conduit, wherein this stored water is maintained at heated or chilled temperatures which are suitable for direct beverage use. The invention is conveniently designed in a compact configuration for use as a countertop unit adapted to be placed adjacent to a standard kitchen sink or the like, as desired.

Figure 3:
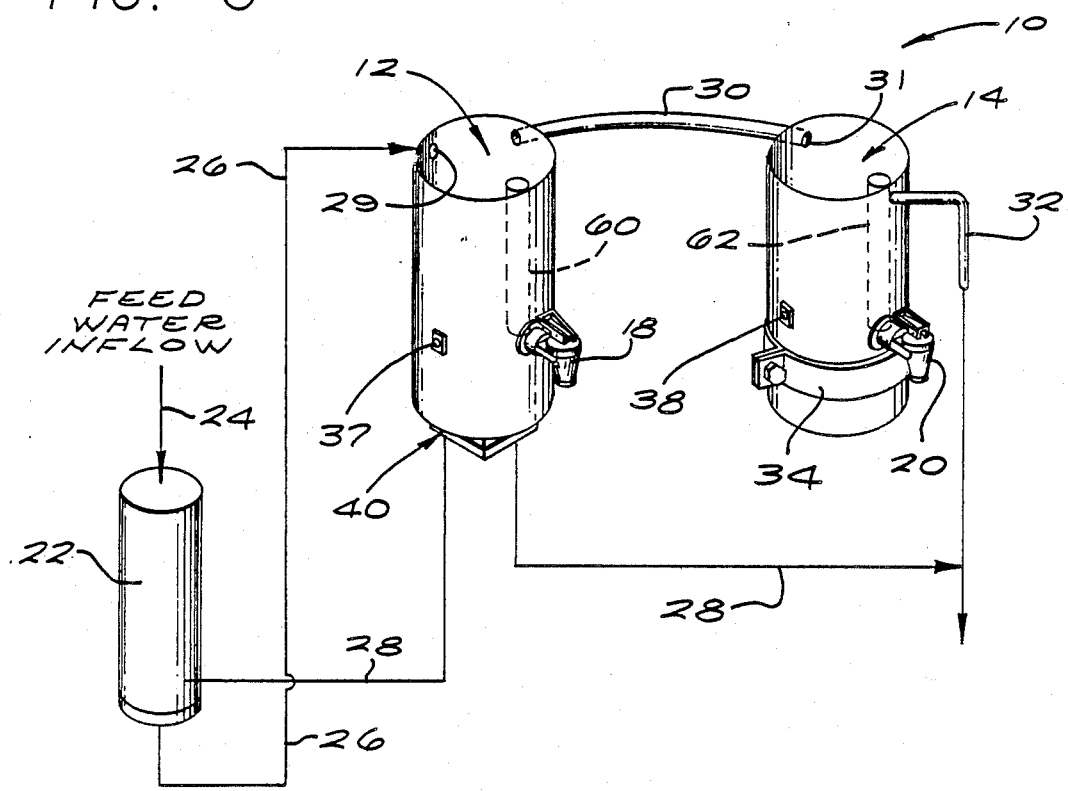
FIG. 3 is a schematic diagram illustrating functional components of the water supply station.

FIG. 3 illustrates a preferred arrangement of the water supply system 10 to include a reverse osmosis unit 22 of a type known in the art for treating ordinary tap water to remove undesired salts, particulates and other impurities to produce a relatively purified water supply. More specifically, the reverse osmosis unit 22 has a feed water inlet coupled to a feed water supply conduit 24 through which incoming water flows into contact with a suitable reverse osmosis membrane (not shown). The reverse osmosis membrane separates the incoming feed water into a relatively purified water supply coupled through a pure outlet conduit 26 to the reservoirs 12 and 14, as will be described, as well as a relatively impure reject or brine water supply which has impurities concentrated therein and is coupled through a reject outlet conduit 28 for flow to a suitable drain. Importantly, the overall construction and operation of the reverse osmosis unit 22 are well known in the art as described, for example, in U.S. Pat. Nos. 4,585,554; 4,595,497; and 4,752,389, which are incorporated by reference herein.

Figure 4:
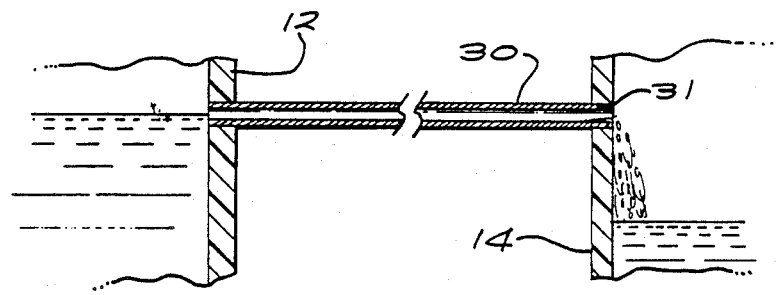
FIG. 4 is an enlarged fragmented sectional view showing serial interconnection of water storage reservoirs.

The purified water supply passes through the pure outlet conduit 26 and into the first storage reservoir 12 through a suitable inlet port 29 near an upper margin thereof. The produced purified water thus fills the first reservoir 12 with a selected volume of water for dispensing as needed or desired through the associated dispensing valve 18. When the first reservoir 12 reaches a filled condition, water within the reservoir 12 reaches the height of an overflow conduit 30 connected between the two reservoirs 12 and 14 near an upper margin thereof. Accordingly, continued pure water flow to the first reservoir 12 causes the excess to spill through the overflow conduit 30 for purposes of filling the second reservoir 14 via an inlet port 31, as viewed best in FIGS. 3 and 4. The two reservoirs 12 and 14 are thus filled in series with the purified water which can be dispensed separately via the dispensing valves 18 and 20 When the second reservoir 14 reaches a filled condition, further purified water production results in spillover from the second reservoir through a drain pipe 32 (FIG. 3) to the drain. Conveniently, the point of connection of the drain pipe 32 to the reservoir 14 is elevationally below the associated inlet port 31 to prevent water backflow to the first reservoir 12.

In accordance with one primary aspect of the invention, the reservoirs 12 and 14 include means for maintaining the stored water therein at different selected temperature levels. More particularly, as viewed in FIGS. 3, 5 and 6, the first reservoir 12 includes means for chilling the water stored therein to a relatively cold temperature such as about 35°–45° F. for direct use in cold beverages and the like. The illustrative temperature control means comprises a cooler assembly 40 mounted at the bottom of the reservoir 12 to orient an upstanding probe 41 in heat transfer relation with water in the reservoir 12. In general terms, the cooler assembly 40 comprises a thermoelectric heat transfer module 44 such as a module manufactured by Borg-Warner Corporation under the model number 920-31 and employing semiconductor materials with dissimilar characteristics (P-type and N-type materials) connected electrically in series and thermally in parallel. The module 44 operates to draw thermal energy from the water within the reservoir 12 via the probe 41, and to transfer that heat energy to an appropriate heat sink for dissipation. The water supply station 10 provides a convenient heat sink in the form of a system water flow to carry heat away from the module.

Figure 5:
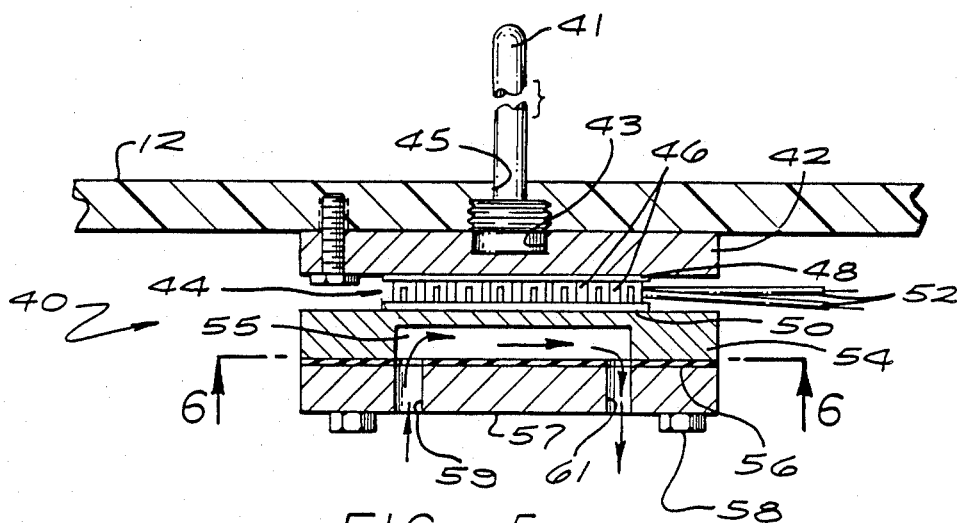
FIG. 5 is an enlarged fragmented sectional view illustrating mounting of a thermoelectric heat transfer module in heat exchange relation with one of the water storage reservoirs.
Figure 6:
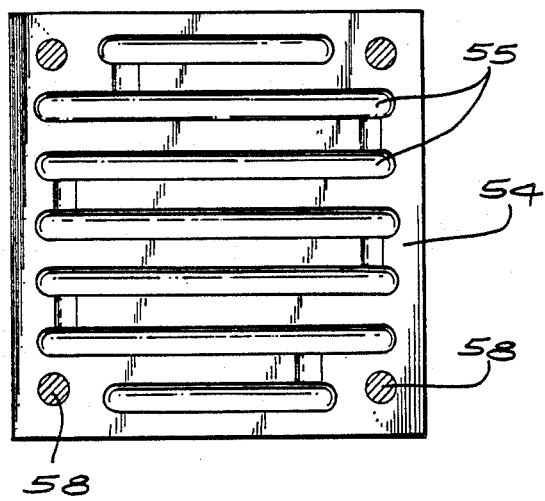
FIG. 6 is a fragmented sectional view taken generally on the line 6—6 of FIG. 5.

More specifically, as shown in detail in FIGS. 5 and 6, the thermoelectric module 44 comprises a plurality of semiconductor devices 46 sandwiched as a group between a pair of support plates 48 and 50. Electrical conductors 52 are appropriately connected to the semiconductor devices 46 and extend from the module for connection to a suitable power supply as will be described. In operation, the semiconductor devices 46 extract heat energy from the upper plate 48 and transfer that energy to the lower plate 50 for dissipation.

The thermoelectric heat transfer module 44 is sandwiched between an upper heat transfer plate 42 and an underlying heat exchanger plate 54. The upper heat transfer plate 42 includes a central counterbore 43 for seated support of the probe 41 which extends through an aperture 45 in the reservoir 12 for direct water contact. The heat exchanger plate 54 includes internal channels 55 (FIGS. 5 and 6) which define an internal flow path adapted for in-line connection with a system water flow, such as by in-line connection with the reject conduit 28 as viewed in FIG. 3. The channels 55 are conventionally formed in the underside of the heat exchanger plate 54 and are covered by a gasket 56.

A lower support plate 57 is fastened in turn onto the plate 54 by bolts 58 or the like which connect directly into the wall of the reservoir 12. Appropriate ports 59 and 61 in the support plate 57 and gasket 56 permit water flow into and through the channels 55 to pick up heat transferred by the module 44. When reject water is used as the heat sink the reject water discharged from the reverse osmosis unit 22 passes through the channels 55 of the heat exchanger plate 54 to pick up heat at the hot side of the thermoelectric module 44. As a result, the module 44 extracts heat from the reservoir water to chill that water to a selected low temperature level for direct use in cold beverages and the like.

Figure 7:
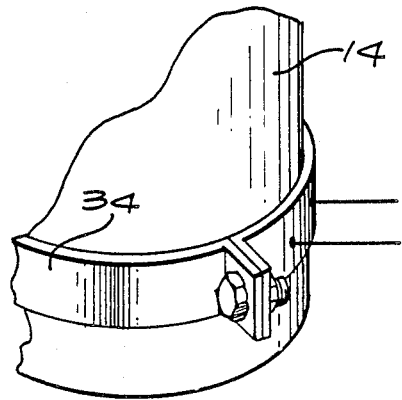
FIG. 7 is an enlarged fragmented perspective view showing mounting of heater means onto one of the water storage reservoirs.

The temperature control means associated with the second reservoir 14 includes a heater band 34 such as an electrical resistance heating element mounted in thermal communication with the water stored within the reservoir 14. This heating band 34 is shown in FIGS. 3 and 7 as a conventional band clamped about a lower end of the reservoir 14. The band 34 includes a conventional resistance element mounted internally and adapted for connection to a suitable power supply via conductors 35. In operation, the heating band 34 functions to elevate the temperature of water within the reservoir 14 to a high temperature such as about 180°-210° F. suitable for direct dispensing and use in making hot beverages.

Figure 8:
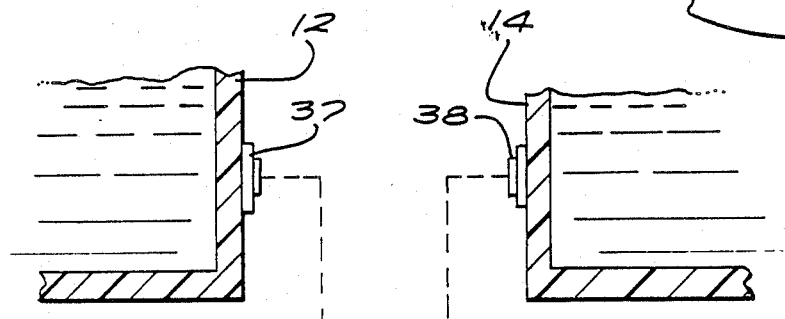
FIG. 8 is a somewhat schematic diagram illustrating a controller and temperature sensors for use in the water supply station.
Figure 8:
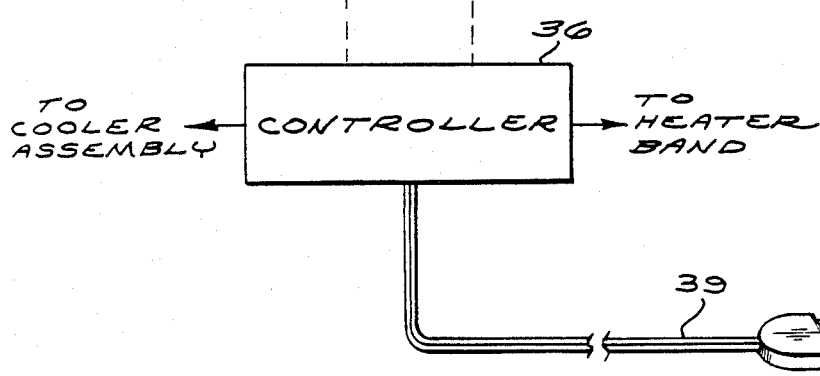

A controller 36 is shown in FIG. 8 for controlling the operation of the water supply station 10 to avoid overchilling or overheating. More particularly, a pair of temperature sensors 37 and 38 of any suitable design are mounted respectively on the reservoirs 12 and 14 to monitor the water temperatures. The controller 36 comprises any suitable circuit known in the art programmed to couple the cooler assembly 40 via conductors 39 to a power supply unless the water temperature in the reservoir 12 reaches a selected low temperature limit. Similarly, the controller 36 is programmed to couple the heater band 34 to be the power supply unless water temperature in the reservoir 14 reaches a selected high temperature limit. When either limit is reached, as monitored by the temperature sensors 37 and 38, the controller 36 functions to disconnect the cooler assembly 40 or the heater band 34 from the power supply to avoid overchilling or overheating. In a preferred form, the controller 36 is designed for plug-in connection to a standard household ac power supply and includes an ac-dc transformer to permit low power dc operation of the cooler assembly and/or heater band.

In use, the water supply station 10 thus provides chilled water within the reservoir 12 and hot water within the reservoir 14. Both supplies of temperature controlled water are obtained from the output of a single water purification device. The cold and hot water volumes are dispensable separately without impacting the water level in the adjacent reservoir. A pair of site tubes 60 and 62 (FIG. 1-3) are conveniently mounted on the reservoirs and include float balls visible through the housing 16 to permit visual monitoring of reservoir water level. Moreover, the interconnecting overflow conduit 30 is sufficiently small in size to provide minimal thermal communication between the reservoirs.

Figure 9:
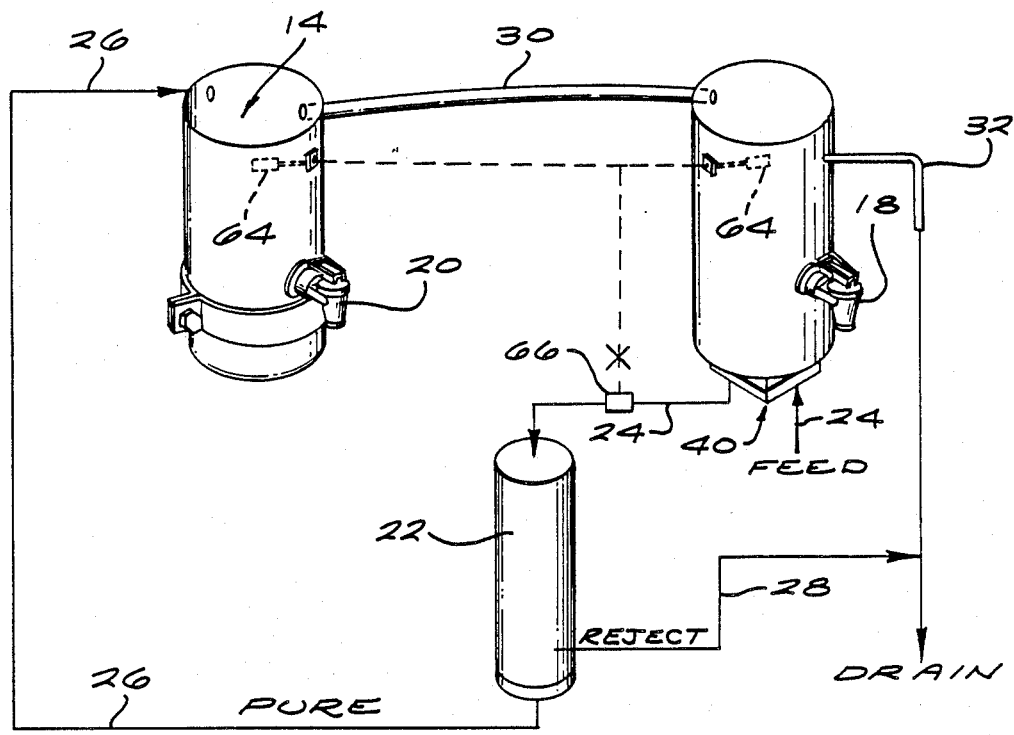
FIG. 9 is a schematic diagram depicting one alternative preferred form of the invention.

FIG. 9 illustrates one alternative system arrangement constructed in accordance with the invention, and wherein components corresponding with those shown and described in FIGS. 1-8 are identified with common reference numerals. FIG. 9 shows the series connected cold and hot reservoirs 12 and 14 in combination with the reverse osmosis unit 22 for producing purified water which flows through the pure outlet conduit 26 to the reservoirs. However, in this embodiment, the system water flow utilized to carry heat away from the cooler assembly 40 comprises the incoming feed water flow to the reverse osmosis unit. That is, the cooler assembly 40 is connected in-line with the feed water conduit 24 such that the heat energy is transferred to the feed water flow for purposes of cooling the water in reservoir 12. Moreover, as shown in FIG. 9, the produced purified water is coupled first to fill the hot reservoir 14 and then to overflow into the cold reservoir 12. The two reservoirs 12 and 14 include individual float mechanisms 64 coupled operationally with a feed inflow valve 66 to shut off feed water inflow to the reservoirs when both reservoirs 12 and 14 reach a filled condition. That is, purified water produced by the reverse osmosis unit 22 is coupled for series filling of the hot reservoir 14 and then the cold reservoir 12. When the last-filled reservoir reaches a filled condition, the float mechanisms 64 cooperatively close the feed water inflow valve 66 to halt further water flow to the reservoirs. With this construction, production of purified water is interrupted to avoid water waste. However, when the water level in either reservoir is lowered by dispensing, at least one of the float mechanisms 64 shifts position to re-open the valve 66 and permit resumed pure water production.

Figure 10:
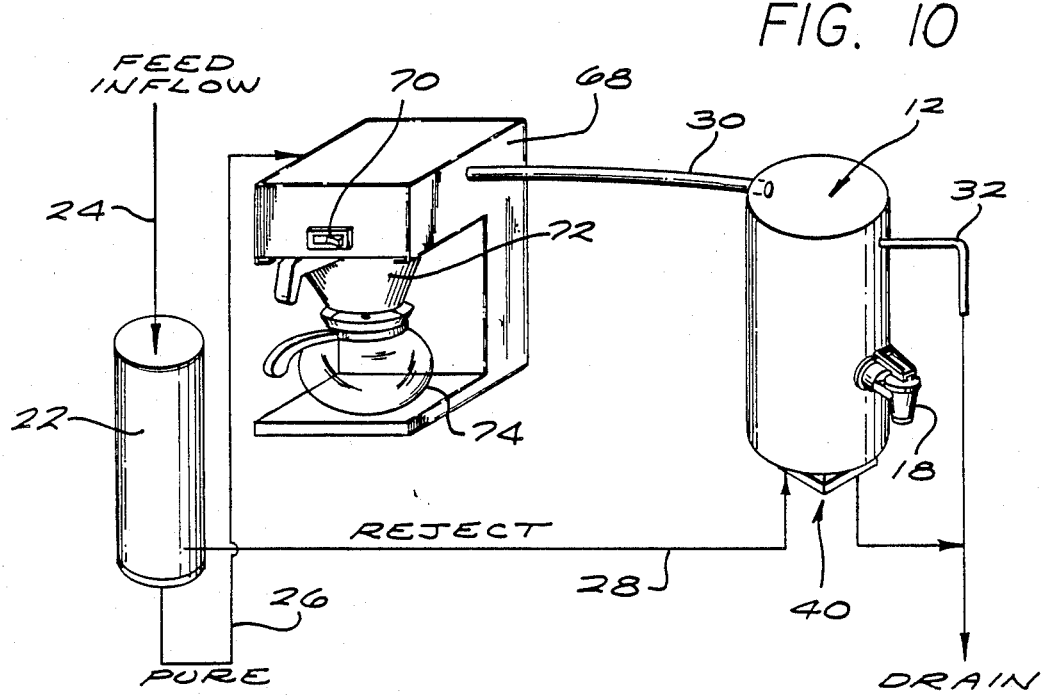
FIG. 10 is a schematic diagram illustrating another alternative preferred form of the invention.

FIG. 10 depicts another preferred system arrangement wherein the hot water reservoir 14 shown in FIGS. 1-9 is replaced by a manually operated reservoir of the type used in coffee maker products. That is, purified water produced by the reverse osmosis unit flows into a hot water reservoir (not shown) within the housing of a drip-type coffee maker 68. This hot water reservoir overflows through an overflow conduit 30 to fill a cold water reservoir 12 including a cooler assembly 40 of the type previously described. When hot water is desired for use in making coffee or the like, a manual switch 70 on the coffee maker 68 can be actuated to energize an appropriate heating element (not shown) and to initiate hot water flow through a drip filter basket 72 into a coffee pot 74 or the like.

The water supply station of the present invention thus provides, in its various forms, multiple water reservoirs for receiving and storing water ready for immediate dispensing at different water temperatures. The invention is particularly useful as a countertop component for a reverse osmosis purification system to provide hot and cold purified water at temperatures for direct and immediate use in beverages.

A variety of further modifications and improvements to the water supply system will be apparent to those skilled in the art. Accordingly, no limitation on the invention is intended by way of foregoing description and the accompanying drawings, except as set forth in the appended claims.

What is claimed is:

1. A water supply station, comprising:
a first reservoir for receiving water from a feed water supply;
a second reservoir;
an overflow conduit coupled between said first and second reservoirs such that water within said first reservoir spills through said overflow conduit when said first reservoir reaches a substantially filled condition to flow into and fill said second reservoir;
dispensing valve means for separately dispensing water from said first and second reservoirs; and
temperature control means for maintaining water within said first and second reservoirs at different temperature levels, said temperature control means including a cooler assembly associated with one of said first and second reservoirs for reducing the temperature of the water therein.

2. The water supply station of claim 1 wherein said cooler assembly comprises a thermoelectric heat transfer module having a hot side and a cold side, and means for transferring thermal energy from said cold side to said hot side.

3. The water supply station of claim 2 further including means for connecting a water flow in heat transfer relation with said hot side of said thermoelectric heat transfer module.

4. The water supply station of claim 1 further including water purification means for receiving water from the feed water supply, said water purification means producing relatively purified water, and means coupling said purified water for flow into said first reservoir.

5. The water supply station of claim 4 wherein said water purification means comprises a reverse osmosis unit.

6. The water supply station of claim 1 wherein said temperature control means further includes a heater member associated with the other of said first and second reservoirs for elevating the temperature of the water therein.

7. A water supply station, comprising:
a first reservoir;
a second reservoir;
an overflow conduit connected between said first and second reservoirs;
means for coupling a flow of water from a feed water supply for flow into said first reservoir to fill said first reservoir sufficiently for water to spill through said overflow conduit to flow into and fill said second reservoir;
first dispensing valve means for dispensing water from said first reservoir;
second dispensing valve means for dispensing water from said second reservoir;
heating means associated with one of said first and second reservoirs to elevate the temperature of the water therein to a selected high temperature level; and
cooling means associated with the other of said first and second reservoirs to reduce the temperature of the water therein to a selected low temperature level.

8. The water supply station of claim 7 wherein said cooling means comprises a thermoelectric heat transfer module.

9. The water supply station of claim 8 further including a reverse osmosis unit for receiving the flow of water from the feed water supply and for producing a purified water supply and a reject water supply, a pure water conduit coupling said purified water supply for flow into said first reservoir, and a reject water conduit coupling said reject water supply for flow to a drain.

10. The water supply station of claim 9 wherein said thermoelectric heat transfer module has a hot side and a cold side, and further including means for coupling said hot side in heat transfer relation with said reject water supply flowing through said reject water conduit.

11. The water supply station of claim 9 wherein said thermoelectric heat transfer module has a hot side and a cold side, and further including means for coupling said flow of water from the feed water supply in heat transfer relation with said hot side prior to passage thereof to said reverse osmosis unit.

12. The water supply station of claim 7 wherein said heating means comprises an electrical resistance heating element.

13. The water supply station of claim 7 further including temperature control means for preventing overheating and overchilling of the water within said first and second reservoirs.

14. The water supply station of claim 7 further including an overflow drain conduit for coupling excess water flow into said second reservoir to a drain.

15. A water supply station, comprising:
a plurality of reservoirs each including individual dispensing valve means for separate dispensing of water contained therein;
overflow conduit means interconnecting said reservoirs in series relation;
means for connecting a flow of water from a feed water supply to one of said reservoirs to substantially fill said one reservoir and to spill through said overflow conduit means to substantially fill the remaining ones of said reservoirs in series; and
temperature control means for maintaining the water within said reservoirs at different temperature levels.

* * * * *